(12) United States Patent
Martz et al.

(10) Patent No.: US 9,065,158 B2
(45) Date of Patent: *Jun. 23, 2015

(54) CORRUGATED FIN AND FRAME ASSEMBLY FOR BATTERY COOLING

(75) Inventors: William L. Martz, Victor, NY (US); Michael Duffield, Medina, NY (US); Megan J. Quick, Honeoye Falls, NY (US); Stuart D. Barter, Lima, NY (US); Glenn W. Skala, Churchville, NY (US); Steven J. Fogarassy, Webster, NY (US); Eric J. Connor, Rochester, NY (US); Thaddeus J. Grey, Canandaigua, NY (US)

(73) Assignee: GM Global Technology Operations LLC, Detroit, MI (US)

(*) Notice: Subject to any disclaimer, the term of this patent is extended or adjusted under 35 U.S.C. 154(b) by 594 days.

This patent is subject to a terminal disclaimer.

(21) Appl. No.: 12/789,888

(22) Filed: May 28, 2010

(65) Prior Publication Data

US 2011/0293982 A1 Dec. 1, 2011

(51) Int. Cl.
*H01M 10/655* (2014.01)
*H01M 10/613* (2014.01)
*H01M 10/6551* (2014.01)
*H01M 10/6557* (2014.01)
*H01M 10/0525* (2010.01)

(52) U.S. Cl.
CPC ...... *H01M 10/5004* (2013.01); *H01M 10/0525* (2013.01); *H01M 10/5046* (2013.01); *H01M 10/5059* (2013.01); *Y02T 10/7011* (2013.01)

(58) Field of Classification Search
USPC .......................................................... 429/120
See application file for complete search history.

(56) References Cited

U.S. PATENT DOCUMENTS

| 3,151,675 | A | * | 10/1964 | Lysholm | 165/166 |
|---|---|---|---|---|---|
| 4,420,039 | A | * | 12/1983 | Dubrovsky | 165/152 |
| 6,720,101 | B1 | * | 4/2004 | Dong et al. | 429/435 |
| 8,460,815 | B2 | * | 6/2013 | Oury et al. | 429/120 |
| 2001/0007728 | A1 | * | 7/2001 | Ogata et al. | 429/120 |
| 2003/0165734 | A1 | * | 9/2003 | Hinton et al. | 429/120 |
| 2004/0247981 | A1 | * | 12/2004 | Cummins et al. | 429/35 |
| 2005/0202303 | A1 | * | 9/2005 | Schlag | 429/36 |
| 2008/0107944 | A1 | * | 5/2008 | Goebel | 429/26 |
| 2010/0266883 | A1 | * | 10/2010 | Koetting et al. | 429/96 |

* cited by examiner

*Primary Examiner* — Patrick Ryan
*Assistant Examiner* — Lucas J O'Donnell
(74) *Attorney, Agent, or Firm* — Fraser Clemens Martin & Miller LLC; Jamos D. Miller

(57) ABSTRACT

A cooling module for a battery pack assembly is disclosed. The cooling module includes a frame having a plurality of legs forming an opening through a central portion of the frame, at least one of the plurality of legs including a slot formed therethrough. A cooling fin is coupled to the frame. The cooling fin includes a corrugated plate interposed between a first plate and a second plate forming a plurality of fluid flow channels between the first plate and the second plate. The cooling modules are disposed in a stack having at least one battery cell disposed between adjacent cooling modules. The battery cell is in heat transfer communication with the cooling fin of at least one cooling module, wherein the cooling fin facilitates a transfer of heat energy between the battery cell and the flow channels formed in the cooling fin.

17 Claims, 7 Drawing Sheets

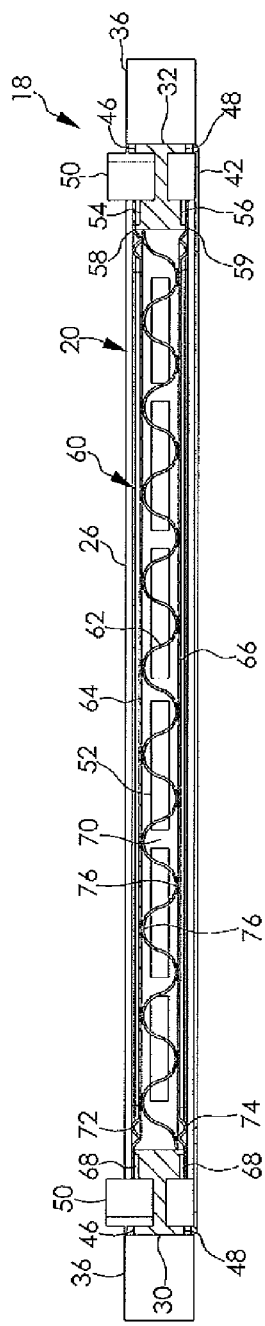

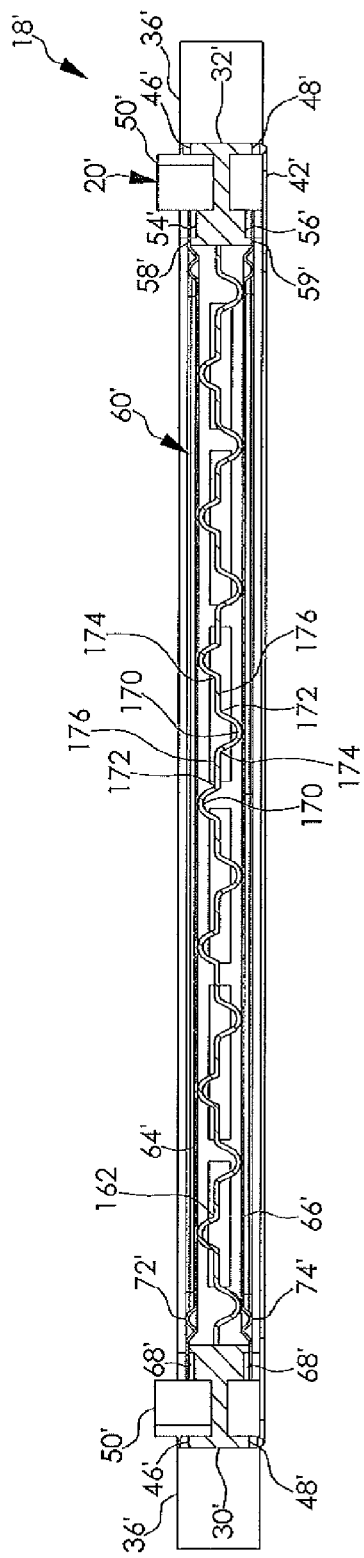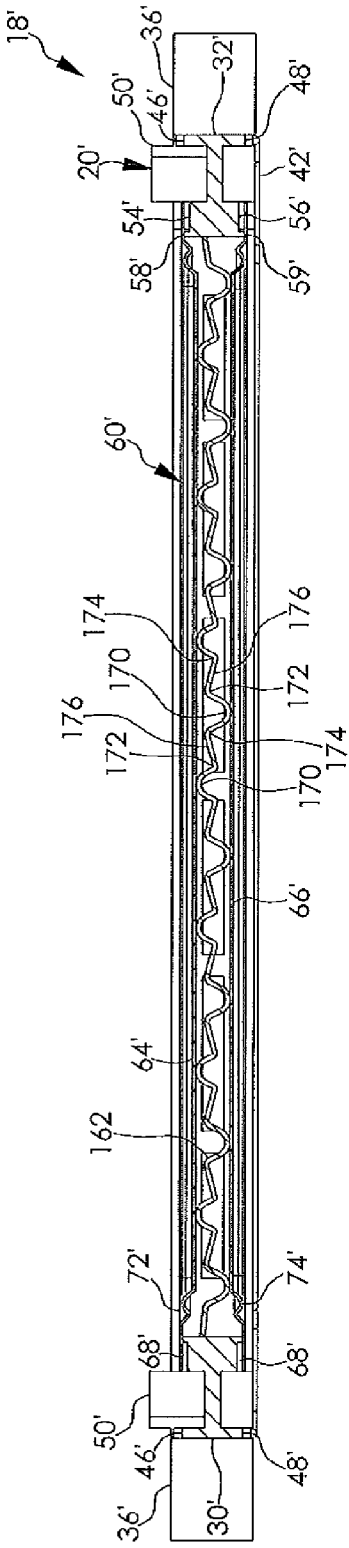

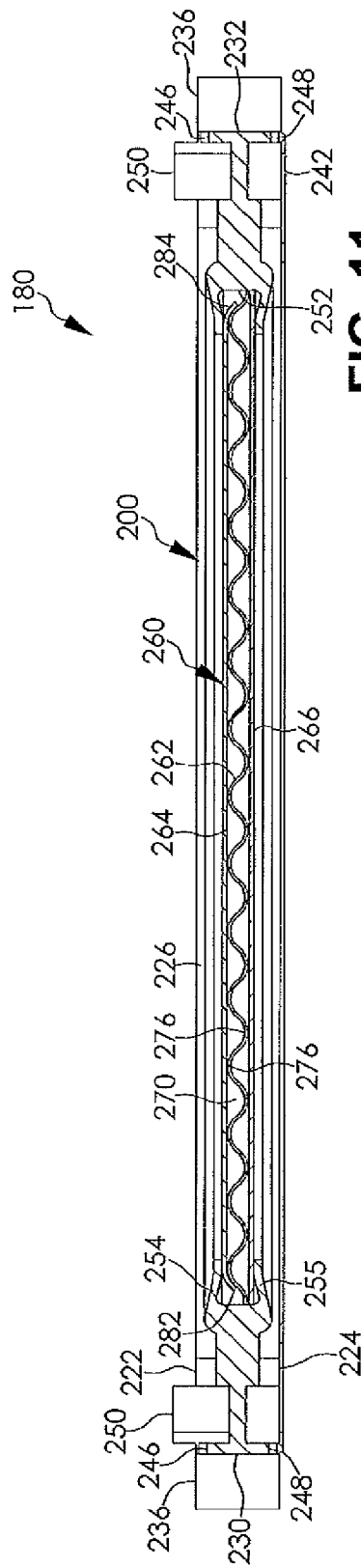
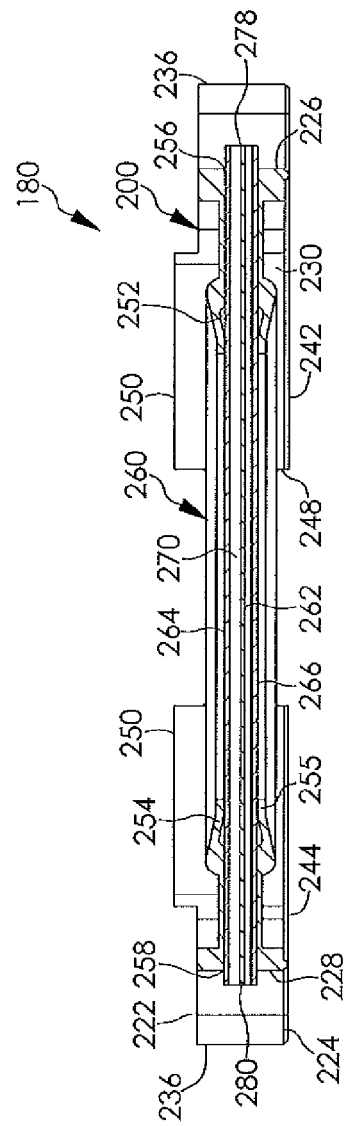
FIG. 11
FIG. 12 though it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

CORRUGATED FIN AND FRAME ASSEMBLY FOR BATTERY COOLING

FIELD OF THE INVENTION

The present disclosure relates to a battery pack and more particularly to a cooling fin and frame assembly for a battery pack.

BACKGROUND OF THE INVENTION

A battery cell has been proposed as a clean, efficient and environmentally responsible power source for an electric device such as an electric vehicle, for example. One type of battery cell is a lithium-ion battery cell. Typically, a plurality of individual lithium-ion battery cells is provided in a stacked configuration to supply an amount of electric power sufficient to operate the electric device.

The lithium-ion battery cells are known to generate heat during a charging and a discharging thereof. When overheated or otherwise exposed to high-temperature environments, the heat can impact the operation of the lithium-ion battery cells. Cooling systems are typically employed with the lithium-ion battery cells, as well as other types of battery cells, to militate against undesirable overheating conditions.

Moreover, as the lithium-ion battery cells charge and are discharged, they may expand, wherein such expansion is commonly known as battery cell swell. Battery cell swell can cause a change in a height of the stack of lithium-ion battery cells and to a compressive force being applied to the individual lithium-ion battery cells. Typically, a battery cell assembly includes a compressible component such as a foam layer disposed between adjacent battery cells, for example, to accommodate battery cell swell and maintain a desired height of the stack of the lithium-ion battery cells and a desired compressive force applied to the individual lithium-ion battery cells. Further, the compressible component also facilitates an accommodation of dimensional tolerances of the components of the battery pack assembly.

To provide such cooling systems and compressible components, a complexity of the battery pack assembly is undesirably increased. Further, the cooling system and the compressible component are typically separate components in the battery pack assembly. Accordingly, a cost of the battery pack assembly is undesirably increased.

It is desirable to produce a compressible cooling fin for a battery pack, wherein an ease of manufacturing the battery pack assembly is maximized and a cost thereof is minimized.

SUMMARY OF THE INVENTION

Compatible and attuned with the present invention, a compressible cooling fin for a battery pack, wherein an ease of manufacturing the battery pack assembly is maximized and a cost thereof is minimized, has been surprisingly discovered.

In one embodiment, a cooling fin for a battery pack assembly comprises a first plate; a second plate spaced apart from the first plate: and a corrugated plate interposed between the first plate and the second plate forming a plurality of fluid flow channels through an interior of the cooling fin, wherein at least one battery cell of the battery pack is in heat transfer communication with the cooling fin.

In another embodiment, a cooling module for a battery pack assembly comprises a frame; and a cooling fin coupled to the frame, the cooling fin including a corrugated plate interposed between a first plate and a second plate forming a plurality of fluid flow channels between the first plate and the second plate, at least one of the first plate and the second plate in heat transfer communication with a battery cell of the battery pack assembly and the flow channels in heat transfer communication with at least one of the corrugated plate, the first plate, and the second plate.

In another embodiment, a battery pack assembly, comprises a plurality of cooling modules disposed in a stack, each of the cooling modules including a frame and a cooling fin coupled to the frame, the frame having a plurality of legs forming an opening through a central portion of the frame, at least one of the plurality of legs including a slot formed therethrough, the cooling fin having a corrugated plate interposed between a first plate and a second plate forming a plurality of fluid flow channels between the first plate and the second plate, the flow channels in heat transfer communication with at least one of the corrugated plate, the first plate, and the second plate; at least one battery cell disposed between adjacent cooling modules and in heat transfer communication with the cooling fin of one of the cooling modules, wherein the cooling fin facilitates a transfer of heat energy between the battery cell and the flow channels formed in the cooling fin; an end plate disposed on at least one end of the battery pack assembly; and a tension member providing a compressive force on the stack of the cooling modules, the battery cells, and the end plate.

BRIEF DESCRIPTION OF THE DRAWINGS

The above, as well as other advantages of the present invention, will become readily apparent to those skilled in the art from the following detailed description, particularly when considered in the light of the drawings described herein.

FIG. 5 is an enlarged cross-sectional view of the cooling module shown in FIGS. 1-3, taken along line 5-5 in FIG. 2, showing a plurality of fluid flow channels formed in an interior of the cooling fin and the cooling fin in an expanded configuration;

FIG. 6 is an enlarged cross-sectional view of the cooling module of FIG. 5, showing the cooling fin in a compressed configuration;

FIG. 7 is an enlarged cross-sectional view of the cooling module shown in FIGS. 1-3, taken along line 7-7 in FIG. 2;

FIG. 8 is an enlarged cross-sectional view of a cooling module according to another embodiment of the invention;

FIG. 9 is an enlarged cross-sectional view of the cooling module of FIG. 8, showing the cooling fin compressed;

FIG. 11 is an enlarged cross-sectional view of the cooling module shown in FIG. 9, taken along line 11-11; and FIG. 12 is an enlarged cross-sectional view of the cooling module shown in FIG. 9, taken along line 12-12.

DETAILED DESCRIPTION OF THE INVENTION

The following detailed description and appended drawings describe and illustrate various embodiments of the invention.

The description and drawings serve to enable one skilled in the art to make and use the invention, and are not intended to limit the scope of the invention in any manner.

Figure 1:
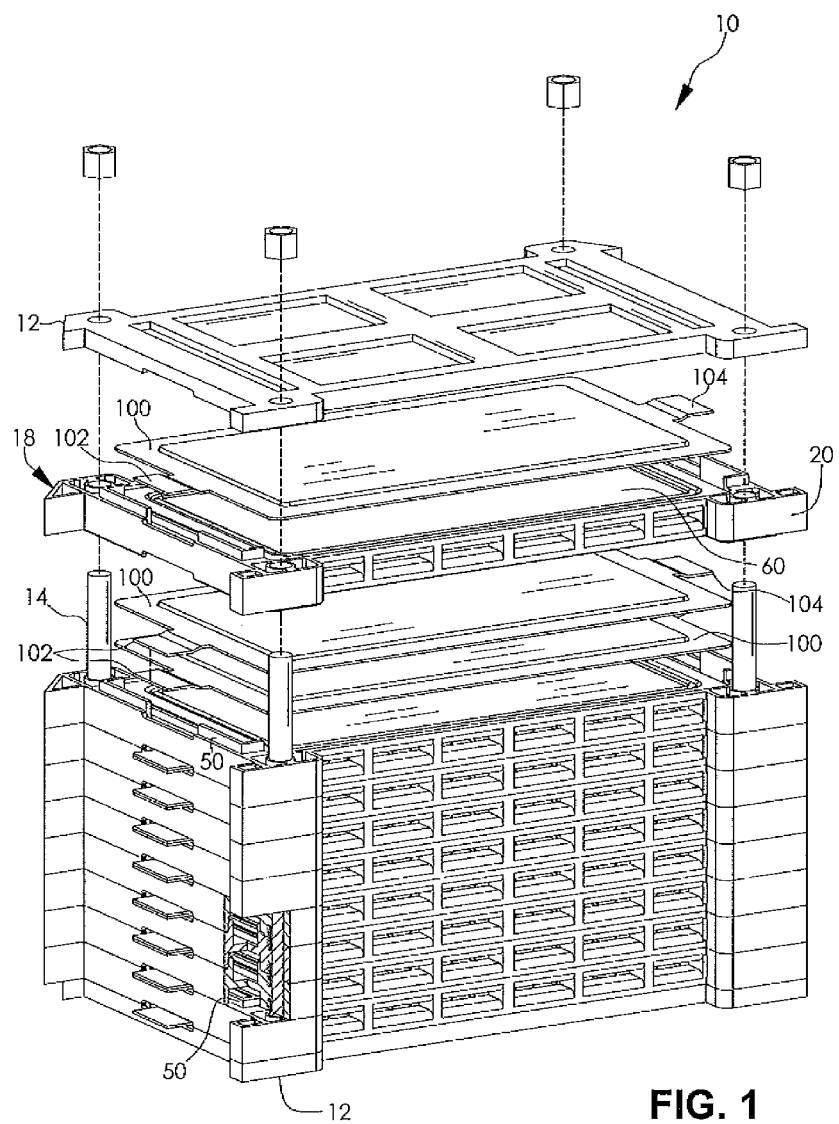
FIG. 1 is a partially exploded perspective view of a battery pack assembly according to the present disclosure, showing a plurality of cooling modules having a cooling fin and a frame.
Figure 2:
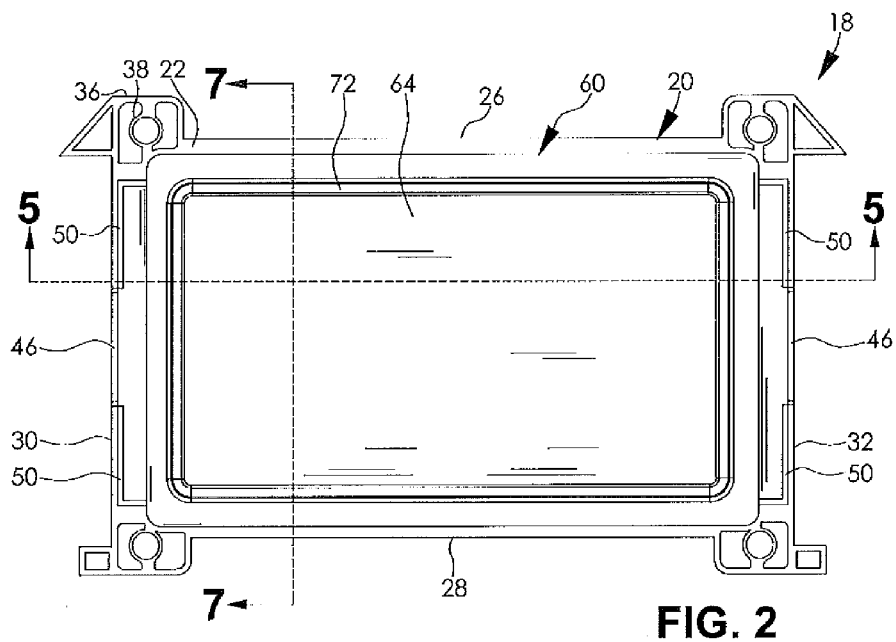
FIG. 2 is a plan view of a first side of the cooling module of FIG. 1.
Figure 3:
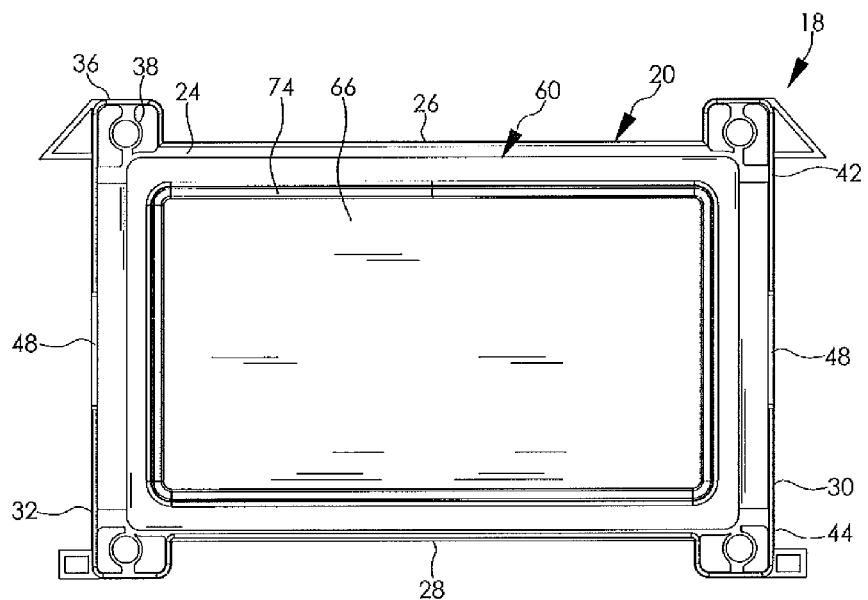
FIG. 3 is a plan view of a second side of the cooling module of FIG, 1.

FIG. 1 shows a battery pack assembly 10 according to an embodiment of the present disclosure for supplying electric power to an associated electric device such as an electric vehicle, for example. The battery pack assembly 10 includes a plurality of cooling modules 18 having a cooling fin 60 coupled to a frame 20. The cooling modules 18 are arranged in a stacked relation having a pair of battery cells 100 disposed therebetween. An end plate 12 may be provided on one or both ends of the battery pack assembly 10. In the illustrated embodiment, the battery cell 100 is a prismatic lithium-ion battery cell having a first electrically conductive tab 102 and a second electrically conductive tab 104 extending outwardly therefrom. It should be understood that other battery cells, employing a different structure and electrochemistry, may also be used. It should be further understood that the battery pack assembly 10 can include a selected number of the cooling modules 18 and the battery cells 100 to deliver a desired amount of electric power to the associated electric device. The first electrically conductive tab 102 and the second electrically conductive tab 104 extend outwardly from between two adjacent cooling modules 18. The electrically conductive tabs 102, 104 may be placed in electrical communication with each other and the associated electrical device employing a wiring harness, electrical connectors, and the like, for example. It should be understood that the electrically conductive tabs 102, 104 may be formed in a desired shape to facilitate establishing electrical communication with each other and the associated electrical device. A plurality of tension rod assemblies 14 extend from one end to an opposite end of the battery pack assembly 10 to hold the cooling modules 18 and the battery cells 100 under compression in the stacked relation. It should be understood that the cooling modules 18, the battery cells 100, and the end caps 12 can be held together in the stacked relation employing a tension member such as one or more of a tension strap and the like disposed around the battery pack assembly 10, for example.

The cooling module 18, more clearly shown in FIGS. 2-7, includes a first side 22 and a second side 24. The frame 20 of the cooling module 18 includes a first leg 26, a second leg 28, a third leg 30, and a fourth leg 32 forming an opening 34 through the central portion of the frame 20. In the illustrated embodiment, the frame 20 and the opening 34 have a generally rectangular shape. It should be understood that the frame 20 and the opening 34 may have other shapes such as square, circular, oval, and the like, for example, to accommodate a shape of the battery cell 100 and a fitment with the associated electrical device. The frame 20 can be formed as a unitary frame by injection molding a material such as a nylon, polypropylene, metal, or other material having suitable physical and chemical properties, for example. Tabs 36 are formed adjacent each corner of the frame 20. An aperture 38 is formed in each of the tabs 36. The apertures 38 cooperate to receive the tension rod assembly 14 to hold the cooling modules 18, the battery cells 100, and the end plates 12 under compression in the stacked relation, as shown in FIG. 1.

A first seal member 42 and a second seal member 44 are disposed on the second side 24 of the frame 20 adjacent an outer peripheral edge thereof. It should be understood that the seal members 42, 44 may be disposed on the first side 22 of the frame 20. The seal members 42, 44 facilitate forming a substantially fluid tight seal around at least a portion of the peripheral edge of adjacent frames 20 in the battery pack assembly 10. It should be understood that the seal members 42, 44 can be provided between the end plate 12 and the frame 20, wherein the seal members 42, 44 are disposed on a surface of the end plate 12 or a surface of the frame 20. Further, it should be understood that the sealing members 42, 44 can be formed from a material dispensed onto the frame 20 or preformed from a gasket material. An adhesive, or the like, can be employed to couple the sealing members 42, 44 to the frame 20.

Recesses 46, 48 are formed in peripheral edges of the third leg 30 and the fourth leg 32 of the frame 20 for receiving the conductive tabs 102, 104 of the battery cells 100 therethrough. Wall sections 50 are formed on the first side 22 of the frame 20 adjacent the corners thereof. As shown in the cutaway portion of FIG. 1, when the cooling modules 18 are placed in the stacked relation, the wall sections 50 of the frame 20 abut the second side 24 of the adjacent frame 20. The wall members 50 facilitate retaining the battery cells 100 between adjacent frames 20 and aligning the repeating frames 20 in the stacked relation. It should be understood that a side of the end plates 12 may include structure similar to the first side 22 or the second side 24 of the frame 20 to facilitate positioning the end plates 12 on the respective ends of the battery pack assembly 10.

A plurality of slots 52 is formed in the first leg 26 and the second leg 28 of the frame 20. The slots 52 provide fluid communication through the legs 26, 28 with the cooling fin 60. Shoulders 54, 56 are formed in the first side 22 and the second side 24, respectively, of the repeating cell frame 20 to facilitate coupling the cooling fin 60 to the frame 20. The shoulders 54, 56 are formed in the legs 26, 28, 30, 32 and circumscribe the opening 34. Beads 58, 59 can be provided in a surface of the shoulders 54, 56, respectively, to further facilitate coupling the cooling fin 60 to the frame 20.

The cooling fin 60 includes a corrugated separator plate 62 interposed between a first cooling plate 64 and a second cooling plate 66. The plates 62, 64, 66 cooperate to provide compressibility to the cooling fin 60, wherein a distance between the plates 64, 66 is reduced upon applying a compressive force to the cooling fin 60. The first cooling plate 64 is disposed on the first side 22 of the frame 20 to cover the opening 34, wherein a peripheral edge of the first plate 64 is adjacent the shoulder 54 and the bead 58 formed on the first side 22 of the frame 20. The second plate 66 is disposed on the second side 24 of the frame 20 to cover the opening 34, wherein a peripheral edge of the second cooling plate 66 is adjacent the shoulder 56 and the bead 59 formed on the second side 24 of the frame 20. The corrugated separator plate 62 is disposed within the opening 34 and retained therein by the plates 64, 66. In the illustrated embodiment, an adhesive 68 is disposed between the shoulders 54, 56 of the frame 20 and the respective sheets 64, 66 to substantially secure the plates 64, 66 to the frame 20. The adhesive may be disposed between the beads 58, 59 and the respective sheets 64, 66. It should be understood that the plates 64, 66 can be coupled to the repeating cell frame 20 employing an ultrasonic weld, a sealing member, a frictional engagement, a snap fit, and the like. It should also be understood that the plates 64, 66 can be integrally formed with the frame 20 by forming the frame 20 around the plates 64, 66 employing an injection molding process, for example.

The corrugated plate 62 and the plates 64, 66 form a plurality of fluid flow channels 70 through an interior of the cooling fin 60. The flow channels 70 extend between opposing edges of the cooling fin 60 and are in fluid communication with the slots 52 formed in the first leg 24 and the second leg 26 of the frame 20. In the illustrated embodiment, the plates 62, 64, 66 are formed from aluminum and have a thickness of between about 0.08 mm to about 0.2 mm. It should be understood that other materials such as stainless steel, coated steel, and non-metals, for example, can be employed to provide a desired strength, thermal conductivity, and corrosion-resistance for the plates 62, 64, 66. Further, other thicknesses may be used for the plates 62, 64, 66. A distance between the plates 64, 66 is between about three (3) mm to about four (4) mm before being compressed and preferably about one (1) mm or greater upon full compression. It should be understood that the distance between the plates 64, 66, the material forming the plates 62, 64, 66, the thickness of the plates 62, 64, 66 can be selected to provide a desired compression rate and a compression distance to the cooling fin 60. In the illustrated embodiment, peripheral beads 72, 74 are formed in the plates 64, 66, respectively, adjacent the peripheral edge thereof. The peripheral beads 72, 74 provide a transition from the peripheral edge of the plates 64, 66 to a substantially planar central portion of the plates 64, 66, wherein the central portion of the plates 64, 66 is recessed in respect of the peripheral edge thereof. The peripheral beads 72, 74 of the plates 64, 66 cooperate with the corrugated plate 62 to establish the undeflected distance between the plates 64, 66.

Figure 4:
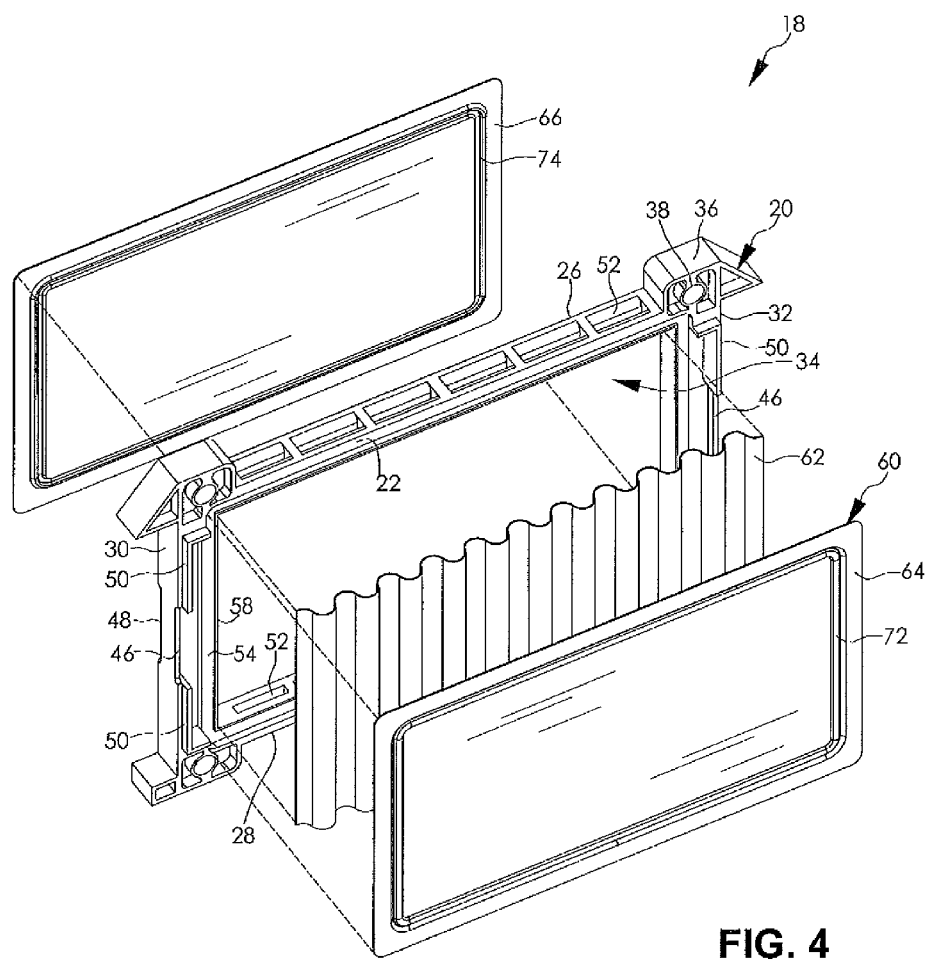
FIG. 4 is an exploded perspective view of the cooling module of FIGS. 1-3, showing a corrugated separator plate disposed between a pair of sheet plates to form the cooling fin.

As clearly illustrated in FIGS. 4-5, the corrugated plate 62 includes a plurality of repeating radiused bends 76 to form a generally sinusoidal cross-sectional pattern in the corrugated plate 62, which imparts a compressibility to the cooling fin 60. It should be understood that substantially linear segments can be provided between subsequent bends 76. A convex surface of each of the bends 76 is in contact with one of the plates 64, 66. FIG. 6 shows the cooling fin 60 subjected to a compressive force. The compressive force causes a deflection of the plates 62, 64, 66 and the distance between the plates 64, 66 to be reduced, wherein the corrugated separator plate 62 is deflected to form a generally square wave cross-sectional pattern. It should be understood that the radius of the bends 76 and an inclusion of substantially linear segments between the bends 76 can be selected to provide a desired compression rate to the cooling fin 60.

FIGS. 8-9 show an alternative embodiment of the corrugated separator plate 62 shown in FIGS. 4-7. Structure similar to that illustrated in FIGS. 4-7 includes the same reference numeral and a prime (') symbol for clarity. In the embodiment shown, a corrugated separator plate 162 includes a first bend 170, a second bend 172, and a third bend 174. A substantially linear segment 176 is formed between the second bend 172 and the third bend 174. It should be understood that a substantially linear segment 176 can be formed between the first bend 170 and the adjacent second bend 172 and between the first bend 170 and the adjacent third bend 174. A convex surface of each of the first bends 170 is in contact with one of the plates 64', 66'. The second bend 172 and the third bend 174 are formed in the corrugated separator plate 162 between subsequent first bends 170. The bends 170, 172, 174 are repeated to form a generally serpentine cross-sectional pattern in the corrugated separator plate 162 which imparts a compressibility to the cooling fin 60', FIG. 9 shows the cooling fin 60' subjected to a compressive force. The compressive force causes a deflection of the plates 162, 64', 66' and the distance between the plates 64', 66' to be reduced. It should be understood that the radius of the bends 170, 172, 174 and an inclusion of the linear segments 176 between the bends 172, 174, 176 can be selected to provide a desired compression rate to the cooling fin 60'.

To assemble the battery pack assembly 10, the cooling modules 18 having the frame 20 and the cooling fin 60 coupled thereto are placed in stacked relation. A pair of the battery cells 100 is disposed between successive cooling modules 18. The tension rod assemblies 14 are inserted in the apertures 34 of the tabs 32 and coupled to the battery pack assembly 10 to apply a compressive force thereto. The compressive force causes the sealing members 42, 44 disposed on the frames 20 and the end plates 12 to abut the adjacent frame 20 or the adjacent end plate 12 and form a substantially fluid tight seal therebetween. The end plates 12, tension rod assemblies 14, and the cooling modules 18 cooperate to provide a substantially fixed length to the battery pack assembly 10 along the length of the tension rods 14. The compressive force places one face of each of the battery cells 100 in contact and in a heat transfer communication with at least one of the cooling fins 60. Further, the compressive force on the cooling fin 60 causes a deflection of the corrugated separator plate 62 and the plates 64, 66 to substantially secure the battery cells 100 between the cooling fins 60 of successive cooling modules 18. The compressibility of the cooling fins 60 facilitates accommodating dimensional variation in components of the battery cell assembly 10 such as a thickness of the frames 20, the plates 62, 64, 66 of the cooling fin 60, and the battery cells 100, for example, while maintaining a desired total compressive force on the battery cells 100. Additionally, the battery cells 100 often swell during the electrical charging or discharging thereof, wherein the thickness of the battery cells 100 increases. Battery cell swell causes a further deflection of the cooling fin 60 to accommodate the increased thickness of the battery cells 100 without causing a substantial increase in the length to the battery pack assembly 10 along the length of the tension rod assemblies 14.

The slots 52 of the frame 60 are in fluid communication with a flow of a fluid such as a liquid or a gas, for example. The fluid is caused to flow through the slots 52 and the flow channels 70 to facilitate a heat transfer between the cooling fin 60 and the fluid. Typically, the fluid is a cooling fluid to transfer heat energy away from the battery pack assembly 10 during the operation thereof. However, it should be understood that the fluid can be a heating fluid under certain environmental conditions to militate against the battery pack assembly 10 being subjected to an undesirable low temperature. It should be understood that the fluid can be caused to flow through the flow channels 70 of the cooling fins 60 by employing a fan or a fluid pump, for example.

The cooling module 18 provides cooling to the battery pack assembly 10 system, wherein an ease of manufacturing the battery pack assembly 10 is maximized and a cost thereof is minimized. Further, the corrugated separator plate 62 provides compressibility to the cooling fin 60 which facilitates the accommodation of thickness variation in the components of the battery pack assembly 10 and battery cell swell while substantially maintaining a desired length of the battery pack assembly 10. The compressibility of the cooling fin 60 eliminates the need to provide a separate compressible component such as a foam or elastomeric component to accommodate thickness variation and battery cell swell.

Figure 10:
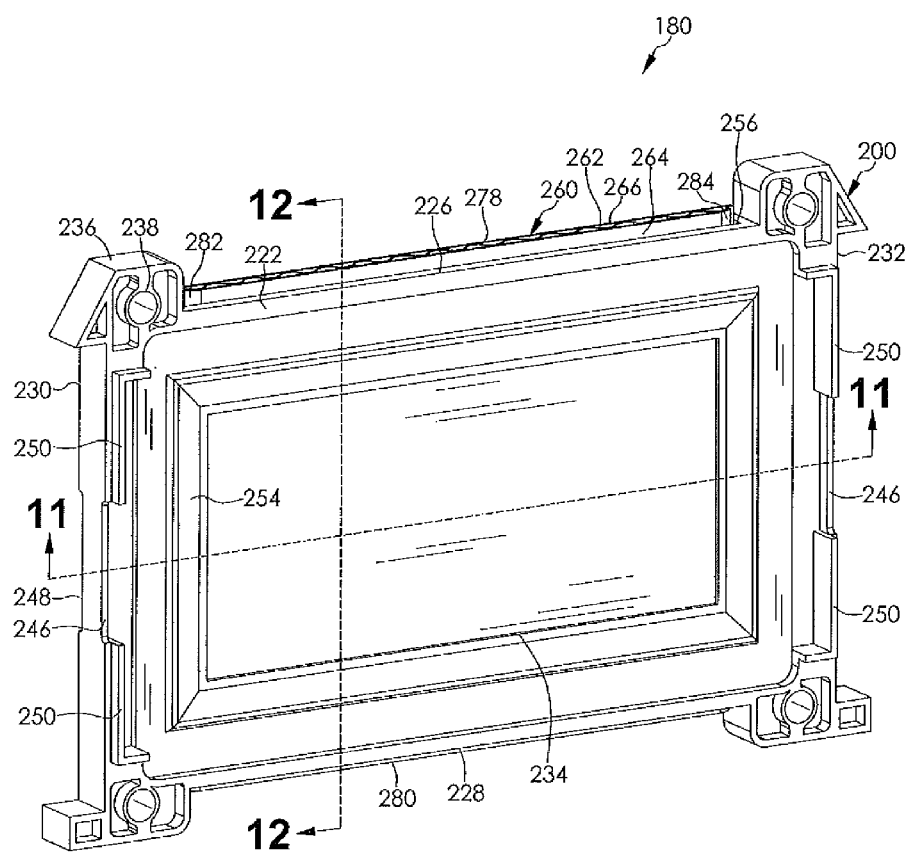
FIG. 10 is a perspective view of a first side of a cooling module according to another embodiment of the invention.

FIGS. 10-12 illustrate an alternative embodiment of the cooling module 18 for the battery pack assembly 10. In FIGS. 10-12, a cooling module 180 includes a frame 220 and a cooling fin 260. The cooling module 180 is shown having a first side 222 and a second side 224. The frame 20 includes a first leg 226, a second leg 228, a third leg 230, and a fourth leg 232 forming an opening 234 through the central portion of the frame 220. In the illustrated embodiment, the frame 220 and the opening 234 have a generally rectangular shape. It should be understood that the frame 220 and the opening 234 may have other shapes such as square, circular, oval, and the like, for example, to accommodate a shape of the battery cell 100 and a fitment with the associated electrical device. Tabs 236 are formed adjacent each corner of the frame 220. An aperture 238 is formed in each of the tabs 232. Similar to the embodiment shown in FIG. 1, the apertures 238 cooperate to receive the tension rod assembly 14 to hold the cooling modules 180 under compression in the stacked relation.

A first seal member 242 and a second seal member 244 are disposed on the second side 224 of the frame 220 adjacent an outer peripheral edge thereof. It should be understood that the seal members 242, 244 may be disposed on the first side 222 of the frame 220. The seal members 242, 244 facilitate forming a substantially fluid tight seal around at least a portion of the peripheral edge of adjacent frames 220 in the battery pack assembly 10. It should be understood that the seal members 242, 244 can be provided between the end plates 12 and the cell frame 220, wherein the seal members 242, 244 are disposed on a surface of the end plates 12 or a surface of the repeating cell frame 220. Further, it should be understood that the sealing members 242, 244 can be formed from a material dispensed onto the frame 220 or preformed from a gasket material. An adhesive, or the like, can be employed to couple the sealing members 242, 244 to the frame 220.

Recesses 246, 248 are formed in peripheral edges of the third leg 230 and the fourth leg 232 for receiving the conductive tabs 102, 104 of the battery cells 100 therethrough. Wall sections 250 are formed on the first side 222 of the frame 220 adjacent the corners thereof. When the cooling modules 180 are placed in the stacked relation, the wall sections 250 of the frames 220 abut the second side 224 of the adjacent frame 220, similar to the stacked relation of the frames 20 illustrated in the cut-away portion of FIG. 1. The wall members 250 facilitate retaining the battery cells 100 between adjacent frames 220 and aligning the frames 220 in the stacked relation.

A channel 252 is formed in the legs 226, 228, 230, 232 of the repeating cell frame 200. The channel 252 circumscribes the opening 234 and slideably receives the cooling fin 260. The channel 252 includes a pair of co-extensive spaced apart lips 254, 255. The lips 254, 255 abut opposing outer surfaces of the cooling fin 260 and form a substantially fluid tight seal therewith. It should be understood that an adhesive, a sealing member, an ultrasonic weld, and the like can be employed to facilitate forming the substantially fluid tight seal between the lips 254, 255 and the cooling fin 260. A first slot 256 is formed in the first leg 226 and a second slot 258 is formed in the second leg 228 of the frame 220. The slots 256, 258 extend to the channel 252 and provide an opening thereto to facilitate slideably inserting the cooling fin 260 within the channel 252, wherein an area of the cooling fin 260 adjacent the peripheral edge thereof is positioned between the lips 254, 255.

The cooling fin 260 includes a corrugated separator plate 262 disposed between a pair of sheet plates 264, 266 forming open ends 278, 280 and substantially sealed ends 282, 284 in the cooling fin 260. The plates 262, 264, 266 cooperate to provide compressibility to the cooling fin 260, wherein a distance between the plates 264, 266 is reduced upon applying a compressive force to the cooling fin 260. The corrugated plate 262 forms a plurality of fluid flow channels 270 through an interior of the cooling fin 260. The flow channels 270 extend between the open ends 278, 280 of the cooling fin 260. In the illustrated embodiment, the plates 262, 264, 266 are formed from aluminum and have a thickness of between about 0.08 mm to about 0.2 mm. It should be understood that other materials such as stainless steel and coated steel can be employed to provide a desired strength, thermal conductivity, and corrosion-resistance for the plates 262, 264, 266. Further, other thicknesses may be used for the plates 262, 264, 266. A distance between the plates 264, 266 is between about three (3) mm to about four (4) mm before being compressed and preferably about one (1) mm or greater upon full compression. It should be understood that the distance between the plates 264, 266, the material forming the plates 262, 264, 266, and the thickness of the plates 262, 264, 266 can be selected to provide a desired compression rate and a compression distance to the cooling fin 260.

As clearly illustrated in FIGS. 10-11, the corrugated separator plate 262 includes a plurality of repeating radiused bends 276 to form a generally sinusoidal cross-sectional pattern in the corrugated plate 262. It should be understood that substantially linear segments can be provided between subsequent bends 276. A convex surface of each of the bends 276 is in contact with one of the plates 264, 266. A compressive force applied to the cooling fin causes a deflection of the plates 262, 264, 266 and the distance between the plates 264, 266 to be reduced, wherein the corrugated plate 262 is deflected to form a generally square wave cross-sectional pattern substantially similar to the square wave pattern in the cooling fin 60 shown in FIG. 6. It should be understood that the radius of the bends 276 and an inclusion of substantially linear segments between the bends 276 can be selected to provide a desired compression rate to the cooling fin 260. The plates 264, 266, 268 can be coupled together along the closed ends 282, 284. The plates 266, 268 can be coupled to the corrugated plate 262 adjacent a convex surface of one or more of the bends 276 to facilitate a heat transfer therebetween and provide a desired compression rate to the cooling fin 260. The sheet plates 264, 266 can be coupled to the corrugated plate 262 employing a welding process, a brazing process, an adhesive, and the like. It should be understood that the corrugated plate 162 shown in FIGS. 8-9 can be employed for the cooling fin 260.

The cooling fin 260 is slideably inserted through the slots 256, 258 and received with the channel 252 to close the opening 234 of the frame 220. It should be understood that the frame 220 can be formed around and integral with the cooling fin 260 in an injection molding process, for example. The lips 254, 255 abut an outwardly facing surface of the respective plates 264, 266 and facilitate retaining the cooling fin 260 within the channel 252 of the frame 220. It should be understood that an adhesive can be employed to facilitate retaining the cooling fin 260 within the channel 252 of the frame 220. The open ends 278, 280 of the cooling fin 260 are disposed adjacent the slots 256, 258, respectively, and are in fluid communication with a flow of a fluid such as a liquid or a gas, for example. The fluid is caused to flow through the flow channels 270 to facilitate a heat transfer between the cooling fin 260 and the fluid. Typically, the fluid is a cooling fluid to transfer heat energy away from the battery pack assembly 10 during the operation thereof. However, it should be understood that the fluid can be a heating fluid under certain environmental conditions to militate against the batter pack assembly 10 being subjected to an undesirable low temperature. It should be understood that the fluid can be caused to flow through the flow channels 270 of the cooling fin 260 by employing a fan or a fluid pump, for example.

The remaining structure and function of the cooling module 180 is substantially the same as the structure and function of the cooling modules 18, 18' shown in FIGS. 1-9 and described herein above.

While certain representative embodiments and details have been shown for purposes of illustrating the invention, it will be apparent to those skilled in the art that various changes may be made without departing from the scope of the disclosure, which is further described in the following appended claims.

What is claimed is:

1. A cooling fin for a battery pack assembly comprising:
a frame having a plurality of legs forming an opening through a central portion of the frame, at least one of the plurality of legs including a plurality of slots formed therethrough;
a first cooling plate positioned on a first side of the frame;
a second cooling plate positioned on a second side of the frame and spaced apart from the first cooling plate; and
a corrugated plate interposed between the first cooling plate and the second cooling plate forming a plurality of fluid flow channels through an interior of the cooling fin, successive ones of the plurality of fluid flow channels in fluid communication with different individual ones of the plurality of slots, wherein the corrugated plate includes a plurality of radiused bends formed therein, wherein at least one of the plurality of radiused bends includes a convex surface in contact with one of the first cooling plate and the second cooling plate; wherein at least one battery cell of the battery pack is in heat transfer communication with the cooling fin.

2. The cooling fin according to claim 1, wherein the corrugated plate includes a first bend having a convex surface in contact with the first cooling plate, a second bend spaced apart from each of the first cooling plate and the second plate, and a third bend having a convex surface in contact with the second cooling plate, wherein the second bend is Mimed in a portion of the corrugated plate extending from the first bend to the third bend.

3. The cooling fin according to claim 2, wherein the corrugated plate includes a substantially linear segment between at least one of the first bend and the second bend, the second bend and the third bend, and the third bend and the first bend.

4. The cooling fin according to claim 1, wherein the cooling fin is formed from one of an aluminum, a stainless steel, and a coated steel.

5. A cooling module for a battery pack assembly comprising:
a frame having a plurality of legs forming an opening through a central portion of the frame, at least one of the plurality of legs including a plurality of slots formed therethrough; and
a cooling fin coupled to the frame, the cooling fin including a corrugated plate interposed between a first cooling plate and a second cooling plate forming a plurality of fluid flow channels between the first cooling plate and the second cooling plate, successive ones of the plurality of fluid flow channels in fluid communication with different individual ones of the plurality of slots, wherein the corrugated plate includes a plurality of radiused bends formed therein, wherein at least one of the plurality of radiused bends includes a convex surface in contact with one of the first cooling plate and the second cooling plate; at least one of the first cooling plate and the second cooling plate in heat transfer communication with a battery cell of the battery pack assembly and the flow channels in heat transfer communication with at least one of the corrugated plate, the first cooling plate, and the second cooling plate.

6. The cooling module according to claim 5, wherein the plurality of radiused bends cause the corrugated plate to have a generally sinusoidal cross-sectional pattern.

7. The cooling module according to claim 5, wherein the corrugated plate includes a first bend, a second bend, and a third bend to form a generally serpentine cross-sectional pattern.

8. The cooling module according to claim 7, wherein the corrugated plate includes a substantially linear segment between at least one of the first bend and the second bend, the second bend and the third bend, and the third bend and the first bend.

9. The cooling module according to claim 5, wherein the first cooling plate is coupled to a first side of the frame and the second cooling plate is coupled to a second side of the frame.

10. The cooling module according to claim 5, wherein the cooling fin is received within the slot formed in the at least one of the plurality of legs and substantially closes the opening formed in the central portion of the frame.

11. A battery pack assembly, comprising:
a plurality of cooling modules disposed in a stack, each of the cooling modules including a frame and a cooling fin coupled to the frame, the frame having a plurality of legs forming an opening through a central portion of the frame, at least one of the plurality of legs including a plurality of slots formed therethrough, the cooling fin having a corrugated plate interposed between a first cooling plate and a second cooling plate forming a plurality of fluid flow channels between the first cooling plate and the second cooling plate, successive ones of the plurality of fluid flow channels in fluid communication with different individual ones of the plurality of slots, wherein the corrugated plate includes a plurality of radiused bends formed therein, wherein at least one of the plurality of radiused bends includes a convex surface in contact with one of the first cooling plate and the second cooling plate, the flow channels in heat transfer communication with at least one of the corrugated plate, the first cooling plate, and the second cooling plate;
at least one battery cell disposed between adjacent cooling modules and in heat transfer communication with the cooling fin of one of the cooling modules, wherein the cooling fin facilitates a transfer of heat energy between the battery cell and the flow channels formed in the cooling fin;
an end plate disposed on at least one end of the battery pack assembly;
a tension member providing a compressive force on the stack of the cooling modules, the battery cells, and the end plate; and
a seal member disposed between adjacent cooling modules and configured to form a substantially fluid tight seal therebetween.

12. The battery pack assembly of claim 11, wherein the plurality of radiused bends cause the corrugated plate to have a generally sinusoidal cross-sectional pattern.

13. The battery pack assembly of claim 11, wherein the corrugated plate includes a first bend, a second bend, and a third bend to form a generally serpentine cross-sectional pattern.

14. The battery pack assembly of claim 11, wherein the cooling fm is received within a first slot formed in a first one of the legs and a second slot formed in a second one of the plurality of legs and substantially closes the opening formed in the central portion of the frame.

15. The cooling fin according to claim 1, wherein a peripheral bead is formed in at least one of the first cooling plate and the second cooling plate, the peripheral bead formed between and integral with a peripheral edge of the at least one of the first cooling plate and the second cooling plate and a center portion of the at least one of the first cooling plate and the second cooling plate, the center portion of the at least one of the first cooling plate and the second cooling plate recessed in respect of the peripheral edge thereof.

16. The cooling fin according to claim 1, wherein the corrugated plate is configured to have a generally sinusoidal cross-sectional pattern when the cooling fin is not under a compressive force and to deflect to a generally square wave cross-sectional pattern when the cooling fin undergoes a compressive force.

17. The cooling fin according to claim 16, wherein the corrugated plate includes a plurality of radioed bends having a convex surface in contact with at least one of the first cooling plate and the second cooling plate when the cooling fin is not under a compressive force and a plurality of generally linear sections in contact with at least one of the first cooling plate and the second cooling plate when the cooling fin undergoes a compressive force.

* * * * *